United States Patent
Toth et al.

(10) Patent No.: US 10,152,820 B2
(45) Date of Patent: Dec. 11, 2018

(54) TEXTURE ADDRESS MODE DISCARDING FILTER TAPS

(71) Applicant: Intel Corporation, Santa Clara, CA (US)

(72) Inventors: Robert M. Toth, Lund (SE); Tim Foley, Concord, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/108,569

(22) Filed: Dec. 17, 2013

(65) Prior Publication Data
US 2014/0267345 A1 Sep. 18, 2014

Related U.S. Application Data
(60) Provisional application No. 61/789,870, filed on Mar. 15, 2013.

(51) Int. Cl.
*G06T 15/00* (2011.01)
*G06T 15/04* (2011.01)

(52) U.S. Cl.
CPC .................. *G06T 15/04* (2013.01)

(58) Field of Classification Search
CPC .................................... G06T 15/04
USPC ..................................... 345/582
See application file for complete search history.

(56) References Cited

U.S. PATENT DOCUMENTS

| | | | | | |
|---|---|---|---|---|---|
| 5,268,928 | A | * | 12/1993 | Herh | H04M 11/06 375/222 |
| 5,920,495 | A | * | 7/1999 | Hicok | G06T 5/20 345/474 |
| 6,094,232 | A | * | 7/2000 | Bayazit | H04N 7/012 348/452 |
| 6,956,974 | B1 | * | 10/2005 | Ito | G06T 3/4084 375/E7.048 |

(Continued)

FOREIGN PATENT DOCUMENTS

| TW | 201142739 A | 12/2011 |
|---|---|---|
| TW | 201209759 A | 3/2012 |

(Continued)

OTHER PUBLICATIONS

Burley, B., et al., "Ptex: Per-Face Texture Mapping for Production Rendering," retrieved from Internet on Mar. 13, 2014, http://disney-animation.s3.amazonaws.com/technology/opensource/ptex/ptex.pdf; Eurographics Symposium on Rendering 2008, 2008, vol. 27, No. 4, The Eurographics Association and Blackwell Publishing Ltd. (10 pages).

(Continued)

*Primary Examiner* — Hai Tao Sun
(74) *Attorney, Agent, or Firm* — Trop Pruner & Hu, P.C.

(57) ABSTRACT

Various embodiments provide for a new texture address mode that excludes any texture filter taps (i.e. coordinates) that fall outside the texture domain from the filtering process. Taps outside a texture domain are not considered in one embodiment. Also, various embodiments provide flexibility as to the texture coordinate locations $t_i$ and values of weights $w_i$. The tap weight can be modified as a function of tap location and in particular whether a tap is within a texture.

24 Claims, 7 Drawing Sheets

(56) References Cited

U.S. PATENT DOCUMENTS

| | | | | |
|---|---|---|---|---|
| 7,091,983 | B1* | 8/2006 | Donovan | G06T 15/04 345/426 |
| 7,324,116 | B2* | 1/2008 | Boyd | G06T 15/04 345/420 |
| 2002/0012002 | A1* | 1/2002 | Ito | G06T 15/04 345/552 |
| 2004/0012610 | A1* | 1/2004 | Taneja | G06T 15/005 345/611 |
| 2005/0046628 | A1* | 3/2005 | Hux | G06T 15/005 345/420 |
| 2007/0080972 | A1* | 4/2007 | Gruber | G06T 3/4007 345/582 |
| 2008/0187173 | A1* | 8/2008 | Kim | G06K 9/32 382/103 |
| 2011/0317045 | A1* | 12/2011 | Vakrat | G06T 5/002 348/242 |
| 2012/0154596 | A1* | 6/2012 | Wajs | H04N 5/33 348/164 |
| 2013/0022281 | A1 | 1/2013 | Sato | |
| 2013/0135364 | A1* | 5/2013 | Govil | G09G 5/10 345/690 |
| 2013/0255998 | A1* | 10/2013 | Iwami | H05K 9/0094 174/250 |

FOREIGN PATENT DOCUMENTS

| | | |
|---|---|---|
| WO | 1999041706 A1 | 8/1999 |
| WO | 20040111947 A1 | 12/2004 |
| WO | 20050093665 A1 | 10/2005 |

OTHER PUBLICATIONS

Kim, S., et al., "A Space-efficient and Hardware-Friendly Implementation of Ptex," retrieved from Internet on Mar. 13, 2014, http://wwwx.cs.unc.edu/~sujeong/Ptex/PTEX-sa011-small.pdf (2 pages).

McDonald, J., et al., "Per Face Texture Mapping for Realtime Rendering," retrieved from Internet on Mar. 13, 2014, http://developer/download.nvidia.com/assets/gamedev/docs/RealtimePtex-siggraph2011.pdf, SIGGRAPH 2011 (51 pages).

Japanese office action issued in corresponding JP application No. 2014-051869 [no English translation] (2 pages).

Korean office action issued in corresponding KR application No. 2014-0030561 dated Mar. 23, 2015 [w/English translation] 6 pages.

Extended European Search Report issued in corresponding EP application No. 14159857.3-1502/2804150 dated Oct. 10, 2014 (8 pages).

Burley, B., et al., "Ptex: Per-Face Texture Mapping for Production Rendering," Eurographics Symposium on Rendering 2008, vol. 27, No. 4 (10 pages).

The Mathworks, Inc., "Image Processing Toolbox—Filtering Using imfilter," 2006; retrieved from the Internet: http://pages.cs.wisc.edu/~dyer/cs766/hw/hw2/filter.pdf, [retrieved Jan. 15, 2015], (7 pages).

Chinese office action issued in corresponding CN application No. 201410183145.X dated Apr. 28, 2016.

Chinese office action issued in corresponding CN application No. 201410183145.X dated Dec. 9, 2016.

Japanese office action issued in corresponding JP application No. 2014-051869 dated Feb. 10, 2015.

Japanese office action issued in corresponding JP application No. 2014-051869 dated Aug. 4, 2015.

Taiwan office action issued in corresponding TW application No. 103109083 dated Apr. 29, 2015.

EP office action issued in corresponding EP application No. 14159857.3 dated Aug. 18, 2017 (4 pages).

CN 4th office action issued in corresponding CN application No. 201410183145.X dated Nov. 15, 2017 (15 pages) [no English translation].

CN Office Action in corresponding CN patent application No. 201410183145.X dated Apr. 3, 2018 (12 pages) [no English translation.

CN 5th Office Action in corresponding CN patent application No. 201410183145.X dated Aug. 17, 2018 (4 pages) [no English translation].

* cited by examiner

TEXTURE ADDRESS MODE DISCARDING FILTER TAPS

CROSS-REFERENCE TO RELATED APPLICATION

This application claims priority to provisional application Ser. No. 61/789,870 filed Mar. 15, 2013, hereby expressly incorporated herein.

BACKGROUND

This relates generally to graphics processing and specifically to texture address modes.

Texture is data mapped to a surface of a shape. Typically the texture data is made up of color values. Each pixel in a texture is called a texel. A texel in a color map then is a color value.

Texture filtering is the way that values are read and combined from a source and then made available to a shader in a graphics pipeline. For example, anisotropic filtering involves trilinearly sampling in a trapezoidal area. However, there are many other texture filtering techniques.

Texture coordinates are specified in a range of 0.0 to 1.0 for each dimension. A texture address mode specifies how to handle filter taps or coordinates outside this range. Like the texture filtering technology, there are many texture address modes.

Figure 1:
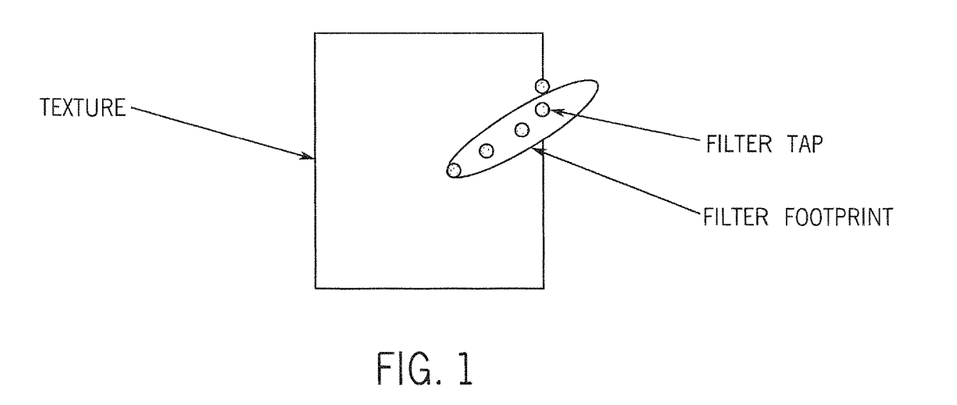
FIG. 1 shows a filter footprint that falls over multiple textures.

Existing texture address modes are not suitable for sampling only the part of the texture filter kernel that falls inside the texture as they each introduce some kind of bias under the edge. In particular as shown in FIG. 1, when the area that a filter covers (filter footprint) falls over multiple textures, D3D11_TEXTURE_ADDRESS_CLAMP provides for taps to be contained within a texture. A smudged edge biased to one side can result. This method can result in poor image quality.

Figure 2:
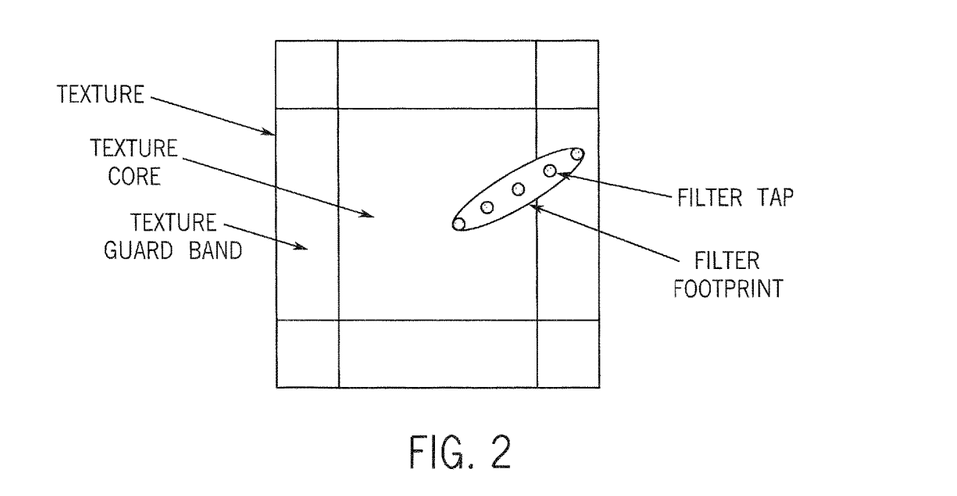
FIG. 2 shows a guard band texture address mode.

Another method involves use of a guard band to the texture. This method is illustrated in FIG. 2. The method allocates a larger texture surface (called a guard band) to accommodate the filter width near the texture edges, and duplicate the adjacent texture's data into the border regions. In effect, the texture filter kernel considers adjacent textures in addition to the texture actually being sampled. This is usually acceptable and may result in improved quality in low-quality rendering scenarios. However, this method requires significantly more memory and bandwidth due to the duplication of data. Also, the shader program must be used to compute some quantities usually computed by the hardware texture sampler. If two fragments are different colors, then resulting samples cause color blend of two fragments. An acceptable color result may occur but at the cost of memory accesses and storage for guard bands and performance of additional computation.

A number of texture taps with individual coordinates (called $t_i$) are weighted using weights (called $w_i$) and summed together for each texture tap. Value i is an integer from 1 to N. The color at each tap's coordinates is determined by the texture address mode function (called F), which is either the texture color at the given coordinate, or the texture color at a modified coordinate as determined by the texture address mode, or a constant border color. The final color (called C) is computed as:

$$C = \Sigma_i(w_i \cdot F(t_i)).$$

The actual computations performed may differ from the mathematical formulation above.

Using this approach, all taps contribute regardless of whether taps fall within a texture. All taps have weight and the sum of weights=1. However, as in the case of the D3D11_TEXTURE_ADDRESS_CLAMP, the taps outside the texture are given weight, and the final color can be distorted.

BRIEF DESCRIPTION OF THE DRAWINGS

Some embodiments are described with respect to the following figures.

DETAILED DESCRIPTION

Various embodiments provide for a new texture address mode that excludes any texture filter taps (i.e. coordinates) that fall outside the texture domain from the filtering process. Taps outside a texture domain are not considered in one embodiment. Also, various embodiments provide flexibility as to the texture coordinate locations $t_i$ and values of weights $w_i$. The tap weight can be modified as a function of tap location and in particular whether a tap is within a texture.

In addition to computing C as usual, the total filtering weight (called H) that falls within the texture can be determined. A new function (called G) returns a one for each point within the texture and a zero for each point outside the texture. Dividing by H can normalize the sum of weights to 1. According to various embodiments, a normalized color C' can be determined as follows:

$$C' = C/H, \text{where}$$

$$H = = \Sigma_i(w_i \cdot G(t_i)).$$

$$i = 1 \ldots N$$

Again, the actual computations performed may differ from the mathematical formulation above.

Figure 3:
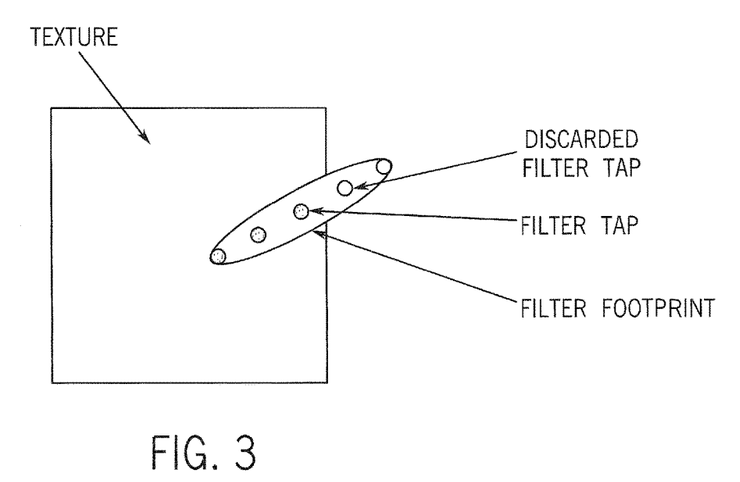
FIG. 3 shows an example with three taps within a texture and two taps outside the texture according to one embodiment.

FIG. 3 provides an example of 3 taps within a texture and 2 taps outside of a texture. In this example, the G value for 3 taps within the texture is 1 and their weight $w_i$ is 0.1. Accordingly, H=0.6 and C'=C/0.6. The final color value is modified by division by H because the total of the weights might not be 1.

In some embodiments, weights for the N taps can be defined so that they sum to one. For example, three taps can be used with weights 0.25, 0.5, and 0.25. If a footprint is an oval and samples are made along a line in the oval, the samples in the middle of the oval could get more weight than those towards the end points. Referring back to the example where taps have weights of 0.25, 0.5, and 0.25, a sample in a middle of an oval could be weighted 0.5. If the weights add to one, so long as taps never get rejected (by having their weights changed to zero or multiplied by zero), there is no need to normalize by dividing by total weight, because total weight will be one.

Whether normalization is used depends on the particular implementation. It would be possible for an implementation to divide the filtered color by the total weight in the texture sampler (TS) and only return the filtered color to the shader.

In some cases, if no texture filter taps were within the texture, then H=0. In this case C' is ill-defined. In some embodiments, when H=0, the color at the point within the texture closest to the filter kernel center is provided as C'.

When H=0, value C' can be determined in one of following manners in some embodiments:

Method A

C'—constant border color (a color chosen by the application when initializing the sampler object)

Method B

C'=[0,0,0,0] (the four numbers are red, green, blue and alpha, respectively)

Method C

Let $t_c$ be the center of the texture filter footprint (this is the coordinate actually provided by the shader). Then, compute the point $t_v$ within the valid texture domain (which is [0,1]×[0,1]) that lies closest to $t_c$:

$$t_v=[\max(0.0,\min(1.0,x(t_c))),\max(0.0,\min(1.0,y(t_c)))].$$

Finally, compute the color using a prior-art texture address mechanism:

$$C'=F(t_v)$$

The clamp texture address mode for F can be used here, but it is conceivable to use other address modes. If there is a texture border, then that could be respected even evaluation $f(t_v)$. Accordingly C' can be a color in the texture closest to the texture filter footprint center.

In the case where a texture has an unused alpha channel, it would be possible to set the alpha channel to one everywhere within the texture, define a constant border color with zero color and alpha, and then use a texture address function that returns the border color for taps that are outside the textures. In this case, the desired color result could be obtained by dividing the color components of the filtered result by the alpha component to renormalize.

The following describes an example comparison of memory usage between some embodiments and the guard band approach. With a hypothetical texture of 128×128 texels and a full MIP MAP hierarchy (MIP MAPs are progressively smaller versions of the same image, used to avoid aliasing within textures), and a filter width of 16 texels (which is quite common) the size of the guard-band method would be:

Mip 0:(128+16)*(128+16)=20736
Mip 1:(64+16)*(64+16)=6400
Mip 2:(32+16)*(32+16)=2304
Mip 3:(16+16)*(16+16)=1024
Mip 4:(8+16)*(8+16)=576
Mip 5:(4+16)*(4+16)=400
Mip 6:(2+16)*(2+16)=324
Mip 7:(1+16)*(1+16)=289
Total: 32053 texels. At 32 bits per pixel (common), this is 125 kB.

Using various embodiments, with no border whatsoever:
Mip 0:(128+0)*(128+0)=16384
Mip 1:(64+0)*(64+0)=4096
Mip 2:(32+0)*(32+0)=1024
Mip 3:(16+0)*(16+0)=256
Mip 4:(8+0)*(8+0)=64
Mip 5:(4+0)*(4+0)=16
Mip 6:(2+0)*(2+0)=4
Mip 7:(1+0)*(1+0)=1
Total: 21845 texels=85 kB According to one embodiment, with a single texel border added for proper interpolation at the very edges, this is:
Mip 0:(128+1)*(128+1)=16641
Mip 1:(64+1)*(64+1)=4225
Mip 2:(32+1)*(32+1)=1089
Mip 3:(16+1)*(16+1)=289
Mip 4:(8+1)*(8+1)=81
Mip 5:(4+1)*(4+1)=25
Mip 6:(2+1)*(2+1)=9
Mip 7:(1+1)*(1+1)=4
Total: 22363 texels=87 kB So various embodiments save approximately 30% memory space on 128×128 textures. For lower resolution textures this number increases (~50% savings for 64×64 textures), and for larger resolutions this number decreases (~17% for 256×256). Systems designed for using many textures per object will most probably use textures of 128×128 texels in size or less, most of the time.

Texture Sampling

Figure 4:
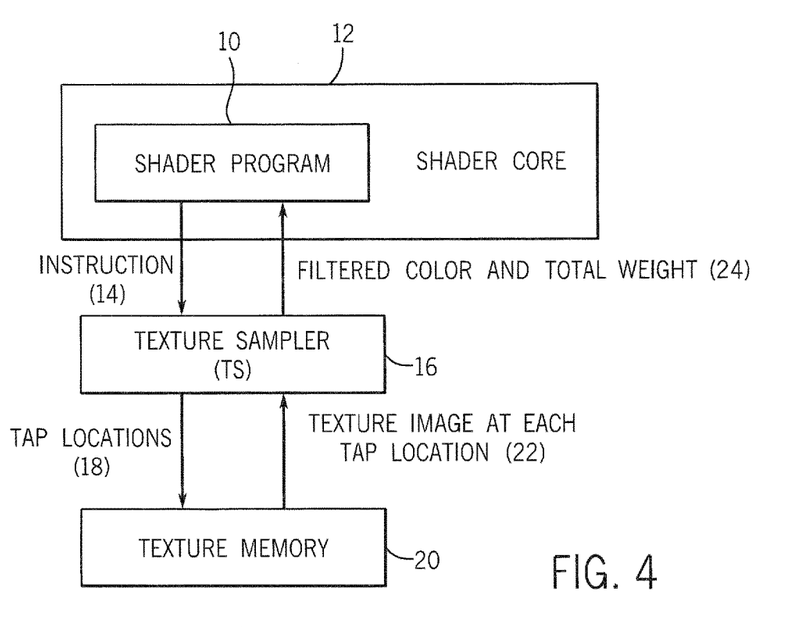
FIG. 4 is a block diagram of one embodiment.

The following is a description of a texture sampling system that uses some embodiments. FIG. 4 provides a block diagram of the system.

1. A shader program 10 executing on a shader core 12 issues an instruction 14 to request texture sampling, specifying the texture image to be sampled, the sampler state to be used, and the (u,v) texture coordinate where it would like to sample the texture (typically, 0<=u<=1 and 0<=v<=1 represents the texture image). The request is passed to the texture sampler (TS) unit 16.

2. Texture Sampler (TS) computes a footprint, centered around the texture coordinate, that represents the region of the texture that should ideally be integrated to compute the filtered color.

3. TS approximates the footprint as a finite number of taps, each of which represents a (u,v) location and a weight, such that a weighted sum of color values at the taps approximates the integral over the entire footprint. The exact approach used depends on how sampler state is configured (e.g., whether anisotropic filtering is enabled).

4. In some embodiments, TS applies an operation (depending on how sampler state is configured) that may modify tap weights based on their location. For example, taps with a (u,v) location outside of the texture image (outside the [0,1]×[0,1] domain), might have their weight set to zero.

5. TS applies an operation (depending on how sampler state is configured) that may modify tap locations 18 in memory 20. For example, any tap with a (u,v) location outside of the texture image, might be moved to the nearest location that is inside the texture image.

a. In some cases, the tap locations are modified by applying a function to each of the U and V coordinates of the tap, independently, to produce modified coordinates U' and V'. Several different modes can be selected, using the sampler state, and different modes can be set for the U and V coordinates.

b. In some cases, a "clamp" mode can be used to determine the new coordinate U' as:
   U'=0 if U<0
   U'=1 if U>1
   U'=U if 0<=U<=1
   and equivalently for V. If both U and V coordinates are configured for this "clamp behavior, then the new location (U', V') will be the closest point in the texture (in terms of linear distance to (U, V).

6. TS loads a color value from a texture image at each tap location 22.
   a. In various embodiments, color is only loaded if weight for tap is non-zero and not loaded if the weight for a tap location is zero. Accordingly, memory access operations for colors that are outside a texture can be avoided.
7. TS multiplies each tap's color by its weight and sums the weighted colors together to produce a filtered color. According to some embodiments, TS computes a total weight by computing the sum of the weights of all taps.
8. TS provides the filtered color and total weight 24 back to shader program.

In some cases, if the sum of weights is greater than 0 but less than 1, the TS can perform a normalization. In some cases, a TS does not perform normalization and instead provides both the un-normalized summed filtered color and the total weight back to the shader. This is useful in the case of implementing Ptex texturing mapping system without multi-sampled anti-aliasing (MSAA), because weights across multiple sampling requests can be combined using shader code before normalizing.

Figure 7:
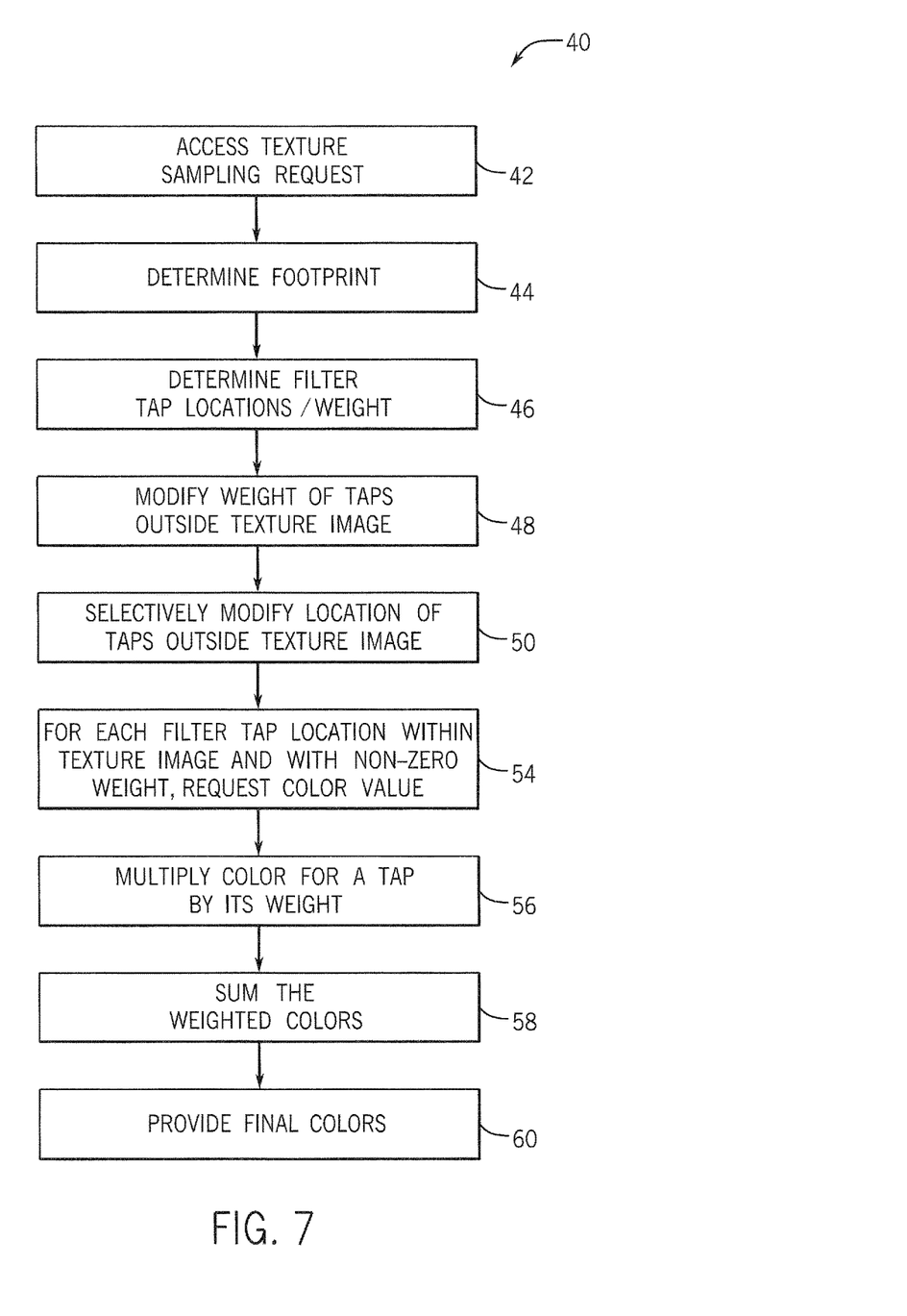
FIG. 7 is a flow chart for one embodiment.

A texture sampling sequence 40, shown in FIG. 7, according to one embodiment may be implemented in software, firmware and/or hardware. In software and firmware embodiments it may be implemented by computer executed instructions stored in one or more non-transitory computer readable media such as magnetic, optical, or semiconductor storage.

In one embodiment, the sequence may begin by accessing a request to perform texture sampling as indicated in block 42. Then a footprint location and size for the sampling are determined as indicated in block 44. Thereafter one or more filter tap locations and a weight for each filter tap associated with the footprint may be determined as indicated in block 46. Next, the weight of any tap that is located outside of texture image is selectively modified as indicated in block 48.

The location of any tap that is located outside the texture image is also selectively modified as indicated in block 50. For each filter tap location within the texture image and with a non-zero weight, a color value in the texture image is requested (block 54). Each color for a tap is multiplied by its weight (block 56). The sum of the weighted colors are determined to generate a filtered color as shown in block 58. Finally, the final filtered color, the final color based on the filtered color is produced as indicated in block 60.

User Models

Various embodiments can be used to implement a graphic processing unit (GPU)-accelerated Ptex-style texturing system. For example, Walt Disney Animation Studios Ptex, Ptex texturing is described on the Internet at Ptex.us. Other versions are available from NVIDIA.

PTEX Implementation (Using Various Embodiments without MSAA)

1. An application running on a central processing unit (CPU) loads geometry data and textures for a model, where each primitive in the geometry may be associated with a distinct texture. As such, there is a potential problem of "seams" showing up at the boundary between textures, if the filtered colors produced by texture sampling are not right.
2. Application creates a sampler state that is configured to use various embodiments.
3. Application creates a shader program that includes a texture-sampling operation.
4. Application binds the textures, sampler state, and shader program to the current state of the GPU, and requests the GPU to render the geometry.
5. GPU rasterizes the primitives in the geometry, producing fragments. If MSAA is not being used, a primitive only generates a fragment when it covers the center of a pixel. In particular, if two adjacent primitives P1 and P2, associated with textures T1 and T2 respectively, both partly cover the same pixel, then only one fragment will be generated (assume it is F1) for the primitive that covers the pixel center. The ideal color value for this pixel will be a combination of the colors from T1 and T2, depending on how much of the pixel is covered by P1 or P2.
6. GPU executes shader program once for each fragment.
7. The shader program requests one or more texture-sampling operations, which are performed using various embodiments.
   a. If processing fragment F1, the shader will first request sampling from texture T1, and get a filtered color where all taps falling outside of T1 are rejected.
   b. Subsequently, the shader will issue additional texture-sampling requests whenever the (x,y) location of the fragment being shaded is near the boundary of the primitive. Each subsequent request is made by finding the texture used by a nearby primitive, and requesting a texture sample operation at a corresponding texture coordinate. If the fragment is near a border, but not near a corner, of the primitive, then this will involve a single additional sample request (e.g., to sample from texture T2). If the fragment is near a corner, then the number of additional requests will depend on the valence of the vertex in the input geometry (that is, the number of primitives that share that vertex in common). The nearby primitives can be found using an adjacency structure built by the application, and accessed by the shader.
8. The shader computes a sum of the filtered colors and total weights across the texture-sampling requests, and computes a final color by dividing the sum of filtered colors by the sum of total weights. This final color is a good approximation of the ideal integral over the oval footprint because of a and b below.
   a. The total weight for each request depends on the proportion of the filter footprint that falls in each texture. This depends on the fraction of the pixel's area covered by each primitive (since the filter footprint is related to the projection of the pixel into texture space.).
   b. Thus, the contribution to the final fragment color from, e.g., T1 and T2 is proportional to the degree to which P1 and P2 (respectively) cover the pixel, which is the ideal result as described above.

Figure 5:
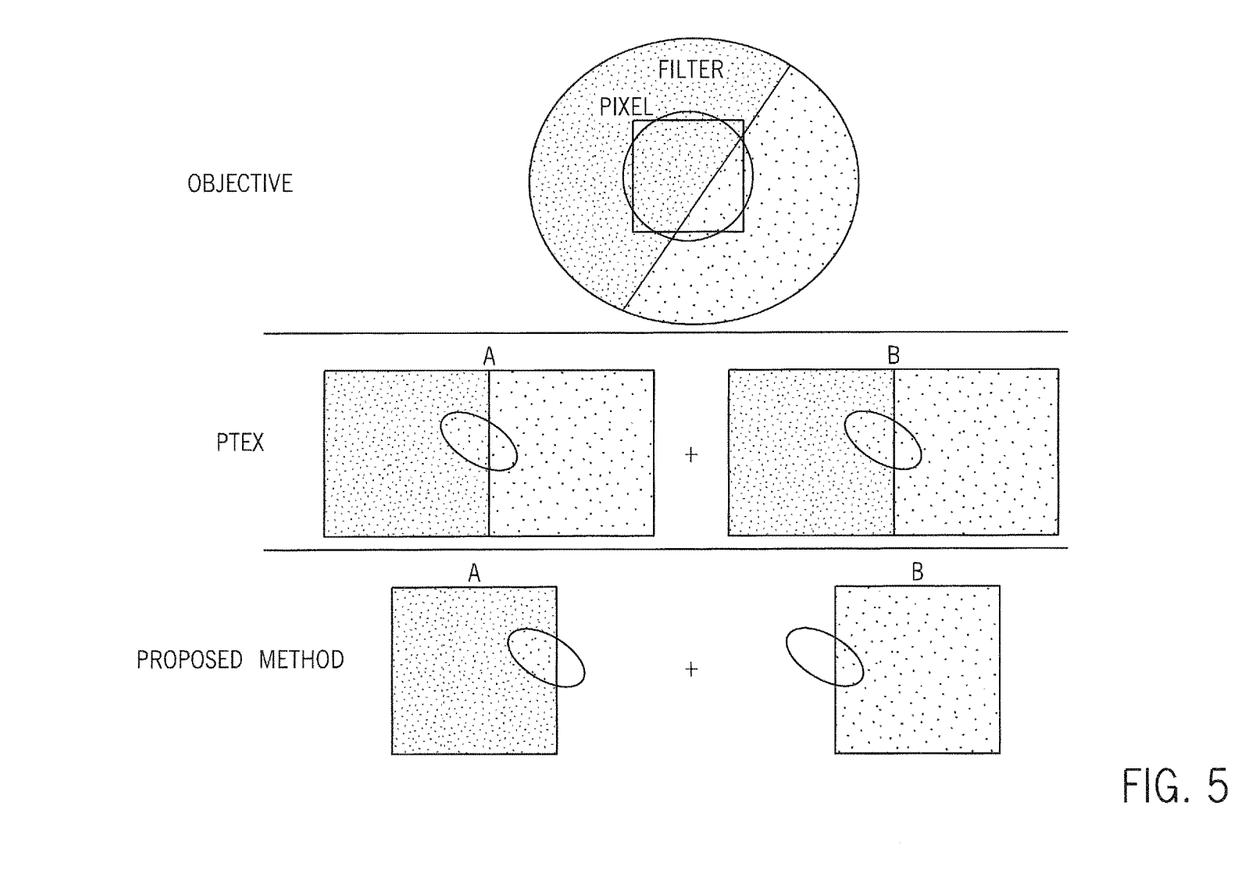
FIG. 5 shows an embodiment using Ptex texturing.

In the example shown in FIG. 5, the objective depiction is shown at the top followed by the PTEX depiction and the result with one embodiment of the techniques described herein is shown at the bottom. In this case, in the objective view, the pixel is in the center but it is partially covered by two fragments, but the center of the pixel is situated in the upper fragment. Thus in the PTEX depiction, the pixel is shown as spanning the fragments along their border. The result of the disclosed techniques, in one embodiment, is a combination of the fragment that includes the pixel center and the fragment that does not include the pixel center as shown in the bottom depiction.

Again, the final color is a good approximation of the ideal integral over the oval footprint shown in the PTEX depiction and the proposed method's depiction. The total weight for each request depends on the proportion of the filter footprint, shown in the top depiction in FIG. 5, that falls in each texture. Thus the contribution of the final fragment color from each of the two fragments is proportional to the extent to which each primitive covers the pixel, which is the ideal result.

PTEX (Using Various Embodiments+MSAA)

1. An application running on host computer loads geometry data and textures for a model, where each primitive in the geometry may be associated with a distinct texture. As such, there is a potential problem of "seams" showing up at the boundary between textures, if the filtered colors produced by texture sampling aren't right.

2. Application creates a sampler state that is configured to use various embodiments.

3. Application creates a shader program that includes a texture-sampling operation.

4. Application binds the textures, sampler state, and shader program to the current state of the GPU, and requests the GPU to render the geometry.

5. GPU rasterizes the primitives in the geometry, producing fragments with coverage masks. In particular, if two adjacent primitives P1 and P2, associated with textures T1 and T2 respectively, both partly cover the same pixel, then fragments F1 and F2 will be generated, each with a different subset of samples enabled in its mask.
   a. The ideal color value for this pixel will be a combination of the colors from T1 and T2, depending on how much of the pixel is covered by P1 or P2.

6. GPU executes shader program once for each fragment.

7. The shader program requests a texture-sampling operation, which is performed using various embodiments (as described above under Texture Sampling).
   a. When processing fragment F1, the texture footprint may span both texture T1 and T2, but with various embodiments, taps that would fall outside of T1 are rejected.
   b. Similarly, when processing F2, taps that fall outside of T2 are rejected.

8. The shader program divides the filtered color by the total weight to compute the color for each fragment. This renormalization step accounts for the rejection of some filter taps by various embodiments. In some cases, the texture sampler can divide the filtered color by the total weight.

9. The fragment back-end of the pipeline receives the fragments along with their masks and computed color values, and composites them onto the samples of the corresponding pixels. Only the samples where the mask is enabled are updated by a given fragment.
   a. Thus, the proportion of samples that contain the color computed for fragments F1 and F2 (using textures T1 and T2) depends on the proportion of the pixel that was covered by primitives P1 and P2.

10. A resolve operation computes a final color value for each pixel, by combining the color values of all the samples in the pixel.
    a. Thus the contribution of color from T1 and T2 is proportional to the degree to which P1 and P2 (respectively) cover samples of each pixel, which is the ideal result as described above.

MSAA Example

Figure 6:
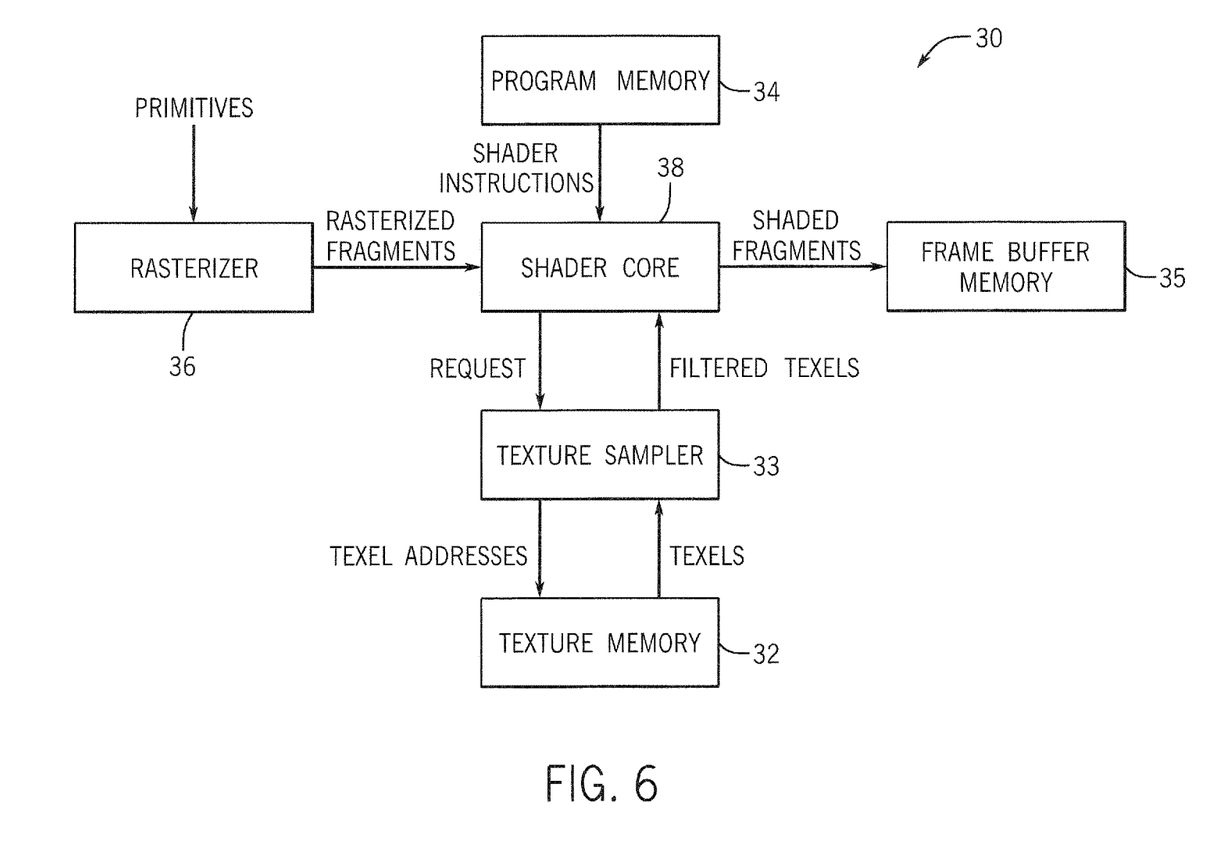
FIG. 6 is a block depiction of one embodiment.

The following provides a description of a process involving texture sampling for use with MSAA. FIG. 6 provides a system 30 that can use embodiments in connection with multi-sample anti-aliasing (MSAA).

1. Program running on host CPU (not depicted) initializes a sampler state.

2. Program running on host uploads textures to Texture Memory 32.

3. Program running on host compiles shader programs and uploads shader program bytecode to program memory 34.
   a. In FIG. 6, separate memories are depicted for textures and shader programs. Some discrete GPUs have shared memory for all of these things. Some embedded GPUs have shared memory for everything, including resources on the host CPU and the GPU. Memory can be physically and/or logically divided in any manner.

4. Program running on host CPU initiates draw call.

5. A GPU processes the draw call

6. One primitive is rasterized at a time
   a. Conceptually it is one primitive at a time. In practice, there may be several triangles being processed in parallel to increase performance.

7. Rasterizer 36 generates fragments, containing (x, y) location of pixel and mask which says which samples in the pixel are covered. Generate fragment for each pixel if primitive covers at least one sample of a pixel. Mask indicates yes/no whether sample covered by primitive. (In multi-sampling, more than one sample is taken per pixel. The frame buffer contents include one color stored per sample. The frame buffer starts with a clear color. The rasterizer tests the overlap at each sample. The result is the determination that the sample is covered or not covered. The shader computes one color per pixel. The pixel location and the coverage information are referred to as a fragment. A fragment is associated with a single triangle. As several triangles overlap a pixel, they have one fragment each. The shaded color is sometimes referred to as a fragment color. The shaded color of the pixel is stored in the frame buffer at each covered sample within the pixel. Non-covered samples retain their old value. The rasterizer tests overlap at each sample and determines coverage. After all geometry is rendered, the multi-sampled frame buffer is resolved into a single sampled surface with one sample per pixel that can be displayed. The color of each sample within a pixel is averaged together to give the final pixel color. Other filtering methods may also be used such as a tent filter or a Mitchell filter but simple average is the most widespread method for real time graphics).

8. Shader core 38 executes program out of program memory, once for each fragment generated by the rasterizer.
   a. Program can be user generated.

9. Shader core program requests texture sampling. Texture sampling indicates coordinates to sample, which is the center of the texture filter footprint.

10. Texture Sampler (TS) 33 determines footprint size (e.g., oval) by determining distance between texture filter footprint centers from neighboring fragments. This distance can possibly be computed in the shader core program.

11. TS computes taps to fetch.

12. TS computes weight of each tap.

13. TS applies operations that modify tap weights based on tap location.
    a. The tap weights can be set in the manner described earlier so that only taps that are within the footprint and within the texture are given weight.

14. TS applies operations that modify tap locations. Tap locations can be modified where taps are outside of a texture. See earlier description of tap relocation to within a texture.

15. TS loads color at each tap from texture memory.
    a. Only load color if the tap weight is non-zero.

16. TS produces single filtered color value for shader core program by multiplying each tap's color by its weight and summing the weighted colors together.

17. Shader core program uses filtered color value in some way to compute a fragment color.

18. Covered samples are assigned the fragment color.

19. When all triangles have been rasterized, pixel color is set to average color of all samples in pixel.

a. After all geometries are rendered, the multi-sampled frame buffer 35 is resolved into a single-sampled surface (one sample per pixel) which can be displayed on the screen.

Other Uses:

In the context of a virtual memory system, taps which translate to addresses inside of unmapped memory pages might be rejected by setting the weight for those taps to zero. In some cases this could avoid the performance cost that would be associated with a page fault.

Figure 8:
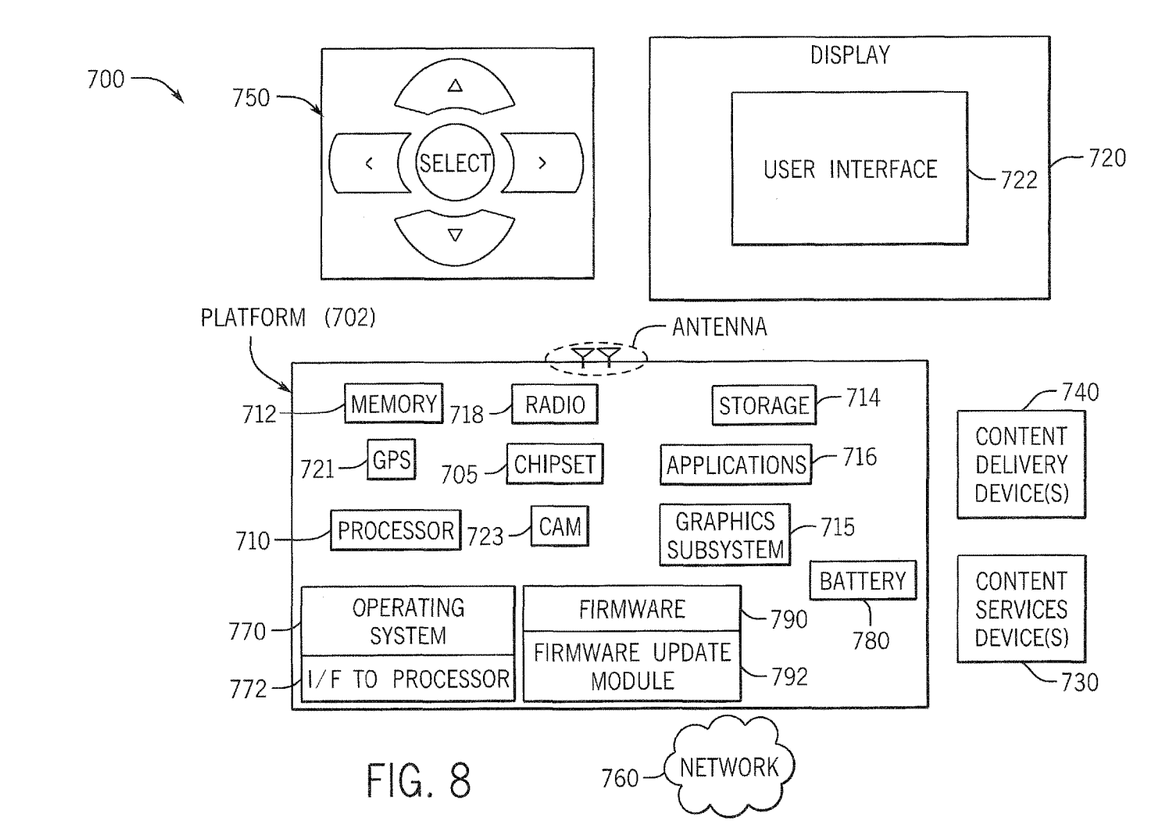
FIG. 8 is a system depiction for one embodiment.

FIG. 8 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 7 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the scope of included embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
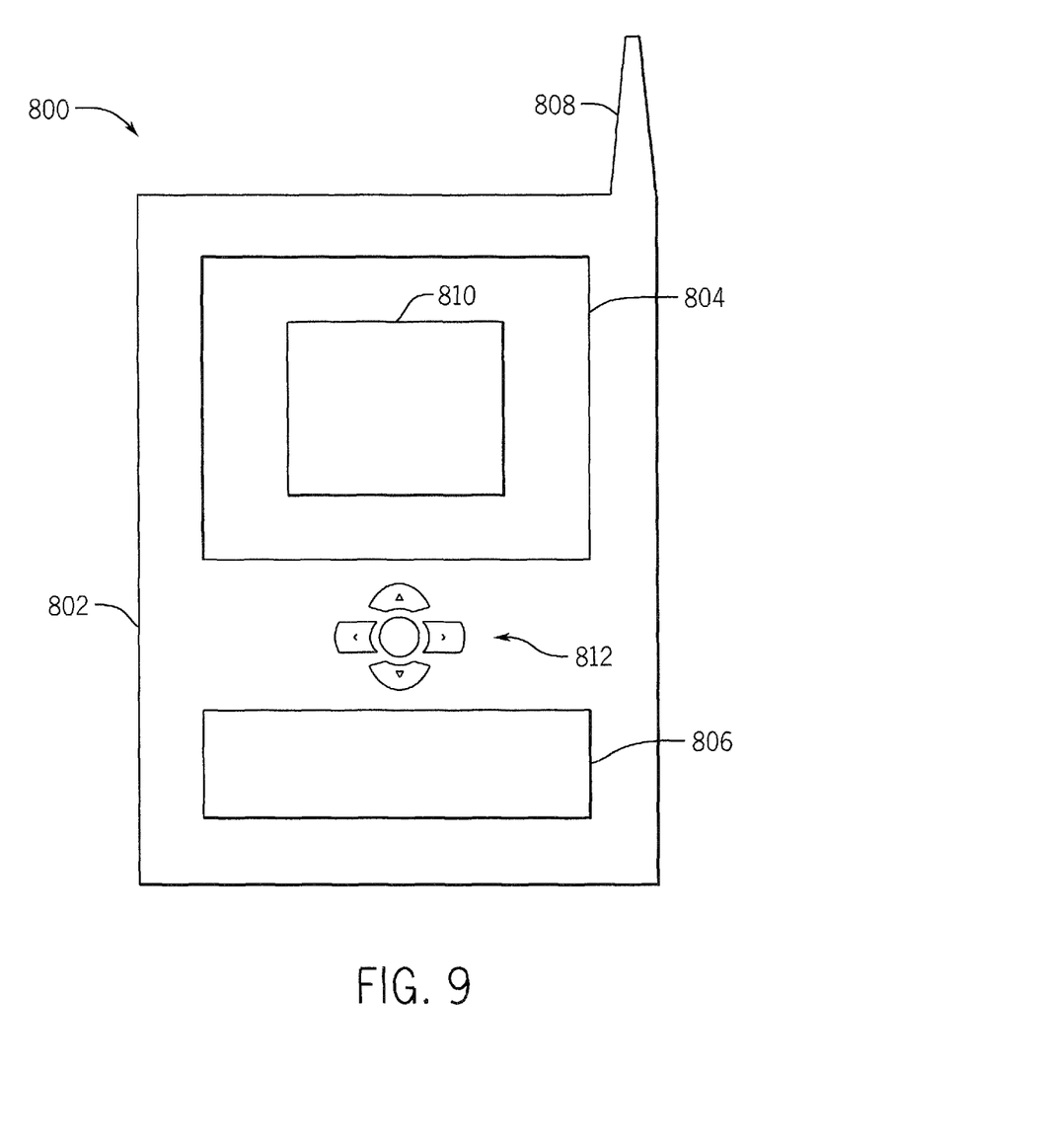
FIG. 9 is a front elevational view of one embodiment.

As described above, system 700 may be embodied in varying physical styles or form factors. FIG. 9 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 7 in software and/or firmware embodiments.

As shown in FIG. 9, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be at least one computer-readable medium comprising instructions stored thereon, that, if executed by a computer, cause the computer to exclude from filtering any texture filter tap that falls outside a texture domain. The computer-readable medium may further store instructions that if executed by a computer, cause the computer to access a request to perform texture sampling, determine a footprint location and size for the sampling, determine one or more filter tap locations and weight for each filter tap associated with the footprint, selectively modify a weight of any tap that is located outside a texture image, selectively modify a location of any tap that is located outside the texture image, for each filter tap location within the texture image and with a non-zero weight, request a color value in the texture image, multiply each color for a tap by its weight, sum the weighted colors to generate a filtered color, and provide a final filtered color, the final color based on the filtered color. The computer-readable medium may further store instructions that if executed by a computer, cause the computer to divide the filtered color by a total weight, wherein the final filtered color comprises the filtered color divided by the total weight and provide the total weight. The computer-readable medium may further store instructions that if executed by a computer, cause the computer to divide the filtered color by a total weight, wherein the final filtered color comprises the filtered color divided by the total weight. The computer-readable medium may further store instructions wherein the final filtered color comprises the filtered color and further comprising instructions stored thereon, that if executed by a computer, cause the computer to provide a total weight. The computer-readable medium may further store instructions wherein the request comprises the texture image to be sampled, the sampler state to be used, and the (u,v) texture coordinates to sample the texture. The computer-readable medium may further store instructions wherein each tap represents a (u,v) location and a weight, such that a weighted sum of color values at the taps approximates an integral over the entire footprint. The computer-readable medium may further store instructions wherein to selectively modify a weight of any tap that is located outside a texture image, the computer is to set the weight to zero. The computer-readable medium may further store instructions wherein to selectively modify a location of any tap that is located outside a texture image, the computer is to select a closest point in the texture to the any tap that is located outside a texture image in terms of linear distance. The computer-readable medium may further store instructions further comprising instructions stored thereon, that if executed by a computer, cause the computer to selectively modify a weight of any tap that is located outside a second texture image, selectively modify a location of any tap that is located outside the second texture image, for each filter tap location within the second texture image and with a non-zero weight, request color value in the second texture image, multiply each tap color within the second texture image by its weight, sum the weighted colors used for the second texture image to provide a second filtered color, and provide a second final filtered color, the second final filtered color based on the second filtered color. The computer-readable medium may further store instructions comprising instructions stored thereon, that if executed by a computer, cause the computer to generate a fragment color based at least in part on a blend of the final filtered color and the second final filtered color. The computer-readable medium may further store instructions further comprising instructions stored thereon, that if executed by a computer, cause the computer to store the fragment color into a buffer, generate a pixel color based at least in part on the fragment color; and cause display of the pixel color. The computer-readable medium may further store instructions comprising instructions stored thereon, that if executed by a computer, cause the computer to in response to the total weight equaling zero, set the filtered color to a color in the texture closest to the footprint center or a pre-defined value.

In another example embodiment a method comprising excluding from filtering in a graphics processor any texture filter tap that falls outside a texture domain. The method may also include accessing a request to perform texture sampling, determining a footprint location and size for the sampling, determining one or more filter tap locations and weight for each filter tap associated with the footprint, selectively modifying a weight of any tap that is located outside a texture image, selectively modifying a location of any tap that is located outside the texture image, for each filter tap location within the texture image and with a non-zero weight, requesting a color value in the texture image, multiplying each color for a tap by its weight, summing the weighted colors to generate a filtered color, and providing a final filtered color, the final color based on the filtered color. The method may also include dividing the filtered color by a total weight, wherein the final filtered color comprises the filtered color divided by the total weight and provide the total weight. The method may also include dividing the filtered color by a total weight, wherein the final filtered color comprises the filtered color divided by the total weight. The method may also include wherein the final filtered color comprises the filtered color and providing a total weight.

Another example embodiment may be an apparatus comprising a processor to exclude from filtering any texture filter tap that falls outside a texture domain and a storage coupled to said processor. The apparatus may include said processor to access a request to perform texture sampling, determine a footprint location and size for the sampling, determine one or more filter tap locations and weight for each filter tap associated with the footprint, selectively modify a weight of any tap that is located outside a texture image, selectively modify a location of any tap that is located outside the texture image, for each filter tap location within the texture image and with a non-zero weight, request a color value in the texture image, multiply each color for a tap by its weight, sum the weighted colors to generate a filtered color, and provide a final filtered color, the final color based on the filtered color. The apparatus may include said processor to divide the filtered color by a total weight, wherein the final filtered color comprises the filtered color divided by the total weight and provide the total weight. The apparatus may include said processor to divide the filtered color by a total weight, wherein the final filtered color comprises the filtered color divided by the total weight. The apparatus may include wherein the final filtered color comprises the filtered color and said processor to provide a total weight. The apparatus may include wherein the request comprises the texture image to be sampled, the sampler state to be used, and the (u,v) texture coordinates to sample the texture. The apparatus may include wherein each tap represents a (u,v) location and a weight, such that a weighted sum of color values at the taps approximates an integral over the entire footprint. The apparatus may include wherein to selectively modify a weight of any tap that is located outside a texture image, the processor is to set the weight to zero. The apparatus may include wherein to selectively modify a location of any tap that is located outside a texture image, the processor to select a closest point in the texture to the any tap that is located outside a texture image in terms of linear distance. The apparatus may include an operating system, a battery and firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. At least one non-transitory computer-readable medium comprising instructions stored thereon, that, if executed by a computer, cause the computer to:
   for a texture image, performing anisotropic filtering by excluding all texture filter taps that fall outside the texture image and by selectively modifying a filtering weight of any tap that is located outside the texture image to distinguish taps located within the texture image;
   for the texture image, determining a color using filter taps inside and outside the texture image;
   determining a normalized final color by dividing said color by said filtering weight;
   storing the texture image in memory with a single texel border around the texture image to reduce memory storage compared to using a guard band;
   said medium further storing instructions to:
      access a request to perform texture sampling;
      determine a footprint location and size for the sampling;
      determine one or more filter tap locations and weight for each filter tap associated with the footprint;
      selectively modify a weight of any tap that is located outside the texture image;
      selectively modify a location of any tap that is located outside the texture image;
      for each filter tap location within the texture image and with a non-zero weight, request a color value in the texture image;
      multiply each color for a tap by its weight;
      sum the weighted colors to generate a filtered color; and
      provide a final filtered color, the final color based on the filtered color.

2. The computer-readable medium of claim 1, further comprising instructions stored thereon, that if executed by a computer, cause the computer to divide the filtered color by a total weight, wherein the final filtered color comprises the filtered color divided by the total weight.

3. The computer-readable medium of claim 1, wherein the final filtered color comprises the filtered color and further comprising instructions stored thereon, that if executed by a computer, cause the computer to provide a total weight.

4. The computer-readable medium of claim 1, wherein the request comprises the texture image to be sampled, a sampler state to be used to sample the texture image, and (u,v) texture coordinates to sample the texture image.

5. The computer-readable medium of claim 1, wherein each tap represents a (u,v) location and a weight, such that a weighted sum of color values at the taps approximates an integral over the entire footprint.

6. The computer-readable medium of claim 1, wherein to selectively modify a weight of any tap that is located outside the texture image, the computer is to set the weight to zero.

7. The computer-readable medium of claim 1, wherein to selectively modify a location of a particular tap that is located outside the texture image, the computer is to select a closest point in the texture image to the particular tap that is located outside the texture image in terms of linear distance.

8. The computer-readable medium of claim 1, further comprising instructions stored thereon, that if executed by a computer, cause the computer to selectively modify a weight of any tap that is located outside a second texture image, selectively modify a location of any tap that is located outside the second texture image, for each filter tap location within the second texture image and with a non-zero weight, request a color value in the second texture image, multiply each tap color within the second texture image by its weight, sum the weighted colors used for the second texture image to provide a second filtered color, and provide a second final filtered color, the second final filtered color based on the second filtered color.

9. The computer-readable medium of claim 8, further comprising instructions stored thereon, that if executed by a computer, cause the computer to generate a fragment color based at least in part on a blend of the final filtered color and the second final filtered color.

10. The computer-readable medium of claim 9, further comprising instructions stored thereon, that if executed by a computer, cause the computer to store the fragment color into a buffer, generate a pixel color based at least in part on the fragment color; and cause display of the pixel color.

11. The computer-readable medium of claim 1, further comprising instructions stored thereon, that if executed by a computer, cause the computer, in response to a total weight equaling zero, to set the filtered color to a color in the texture image closest to a footprint center.

12. A method comprising:
for a texture image, performing anisotropic filtering by excluding all texture filter taps that fall outside the texture image and by selectively modifying a filtering weight of any tap that is located outside the texture image to distinguish taps located within the texture image;
for the texture image, determining a color using filter taps inside and outside the texture image;
determining a normalized final color by dividing said color by said filtering weight;
storing the texture image in memory with a single texel border around the texture image to reduce memory storage compared to using a guard band;
said method further including:
accessing a request to perform texture sampling;
determining a footprint location and size for the sampling;
determining one or more filter tap locations and weight for each filter tap associated with the footprint;
selectively modifying a weight of any tap that is located outside the texture image;
selectively modifying a location of any tap that is located outside the texture image;
for each filter tap location within the texture image and with a non-zero weight, requesting a color value in the texture image;
multiplying each color for a tap by its weight;
summing the weighted colors to generate a filtered color; and
providing a final filtered color, the final color based on the filtered color.

13. The method of claim 12 including dividing the filtered color by a total weight, wherein the final filtered color comprises the filtered color divided by the total weight.

14. The method of claim 12, wherein the final filtered color comprises the filtered color and providing a total weight.

15. An apparatus comprising:
a processor to exclude from filtering all texture filter taps that fall outside a texture image and to selectively modify a weight of any tap that is located outside the texture image and for the texture image, determine a color using filter taps inside and outside the texture image, and determine a normalized final color by dividing said color by said filtering weight, store the texture image in memory with a single texel border around the texture image to reduce memory storage compared to using a guard band; said processor to access a request to perform texture sampling, determine a footprint location and size for the sampling, determine one or more filter tap locations and weight for each filter tap associated with the footprint, selectively modify a location of any tap that is located outside the texture image, for each filter tap location within the texture image and with a non-zero weight, request a color value in the texture image, multiply each color for a tap by its weight, sum the weighted colors to generate a filtered color, and provide a final filtered color, the final color based on the filtered color, and
a storage coupled to said processor.

16. The apparatus of claim 15, said processor to divide the filtered color by a total weight, wherein the final filtered color comprises the filtered color divided by the total weight.

17. The apparatus of claim 15, wherein the final filtered color comprises the filtered color and said processor to provide a total weight.

18. The apparatus of claim 15, wherein the request comprises the texture image to be sampled, a sampler state to be used to sample the texture image, and (u,v) texture coordinates to sample the texture image.

19. The apparatus of claim 15, wherein each tap represents a (u,v) location and a weight, such that a weighted sum of color values at the taps approximates an integral over the entire footprint.

20. The apparatus of claim 15, wherein to selectively modify a weight of any tap that is located outside a texture image, the processor is to set the weight to zero.

21. The apparatus of claim 15, wherein to selectively modify a location of a particular tap that is located outside the texture image, the processor to select a closest point in the texture image to the particular tap that is located outside the texture image in terms of linear distance.

22. The apparatus of claim 15 including a display communicatively coupled to the processor.

23. The apparatus of claim 15 including a battery coupled to the processor.

24. The apparatus of claim 15 including firmware and a module to update said firmware.

* * * * *